Jan. 12, 1960 L. G. STADTMILLER ET AL 2,920,925
EMERGENCY BRAKE SYSTEM
Filed Dec. 10, 1953
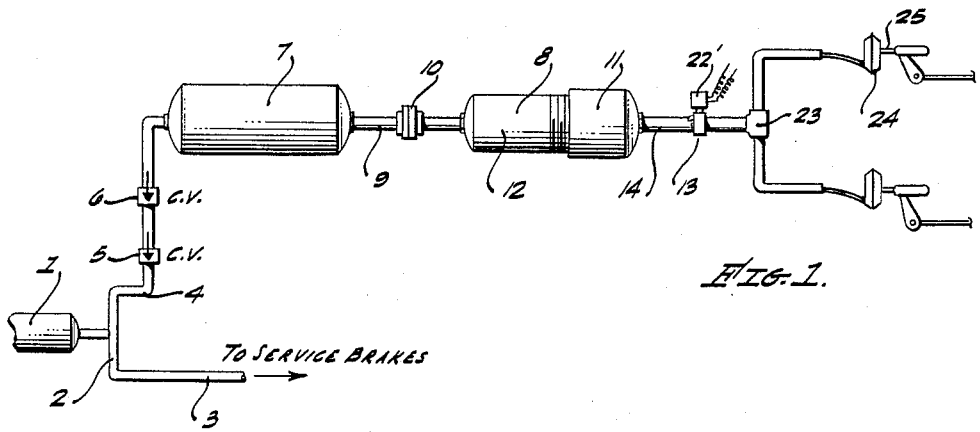
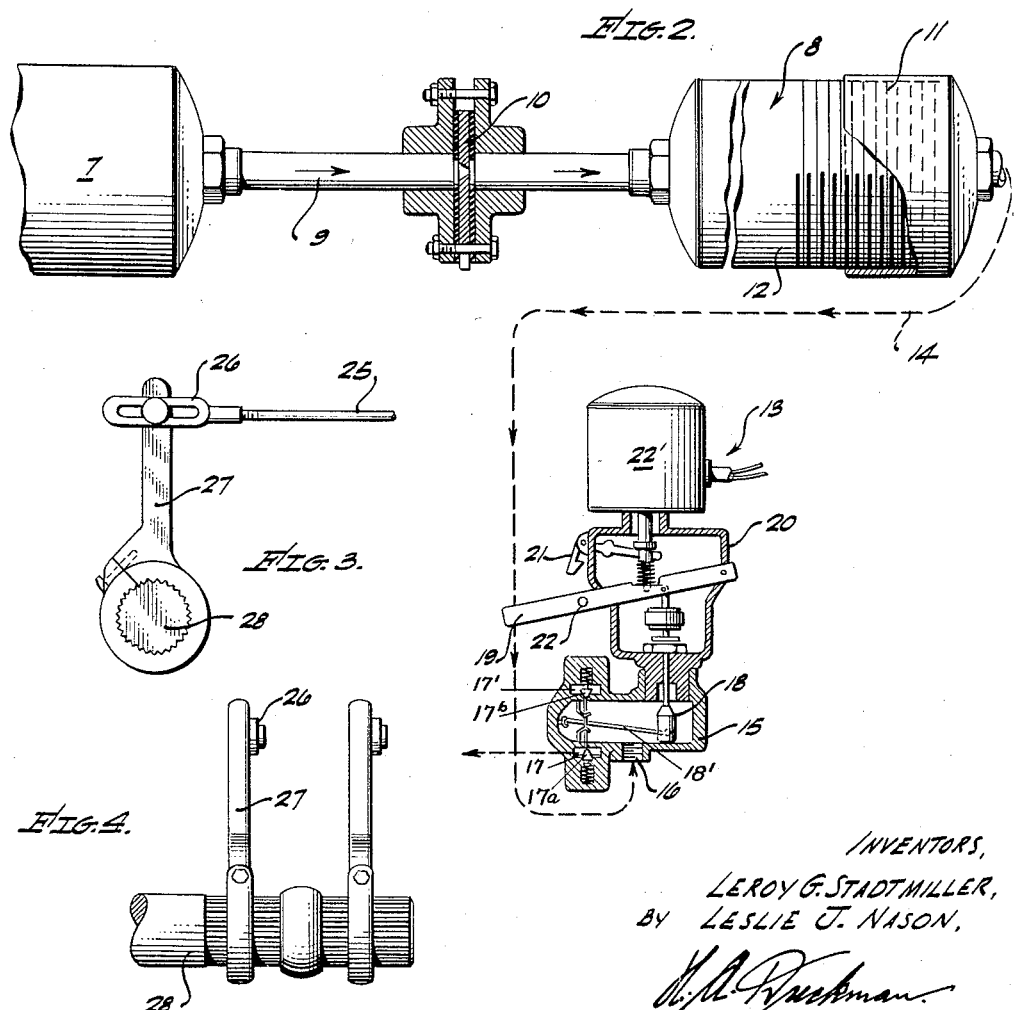
INVENTORS,
LEROY G. STADTMILLER,
BY LESLIE J. NASON,
ATTORNEY.

2,920,925

EMERGENCY BRAKE SYSTEM

Leroy G. Stadtmiller and Leslie J. Nason,
Long Beach, Calif.

Application December 10, 1953, Serial No. 397,296

5 Claims. (Cl. 303—48)

This invention relates to an emergency brake system, particularly for heavy vehicles, such as trucks.

An object of our invention is to provide a novel emergency brake system which, after once being actuated by the driver, will complete its cycle of operation to stop the vehicle and cannot be interrupted until the vehicle has been brought to a halt, after which the emergency brake system must be manually reset and released.

Another object of our invention is to provide a novel air actuated brake system which will stop the vehicle independently of the air supply of the service brake.

Another object of our invention is to provide a novel emergency brake system in which two storage tanks are provided, the one tank feeding into the other, and in which the rate of flow of air from the one tank to the other is controlled so that the vehicle will come to a gradual stop.

A feature of our invention resides in one of the interconnected tanks being adjustable as to capacity so that it may be adapted to any type of vehicle.

Another object of our invention is to provide an emergency brake system in which the emergency brake may be applied even though the service brakes are partly or entirely applied.

Another feature of our invention is to provide a novel emergency brake system in which the emergency brake unit in no way interferes with the operation of the parking brake.

Other objects, advantages and features of invention may appear from the accompanying drawing, the subjoined detailed description and the appended claims.

In the drawing:

Figure 1 is a schematic drawing of our emergency brake system.

Figure 2 is a fragmentary side elevation partly in section, illustrating the tanks and the method of controlling the flow of fluid from these tanks.

Figure 3 is an end view of the actuating arm.

Figure 4 is a side elevation of the brake shaft and control arms thereon.

Referring more particularly to the drawing, the numeral 1 indicates the usual fluid source which may be either bottled air or gas, or may be a pump of any desired type. The fluid flow from the source 1 extends into a T 2, the one arm 3 of which extends to the usual service brakes of the vehicle, the other arm 4 of the T extends to the check valves 5 and 6, and thence into the main or storage tank 7. The tank 7 has sufficient capacity to insure that the vehicle will be brought to a stop and that the brakes of this vehicle will be correctly actuated to insure a safe and complete stop even though the vehicle is fully loaded. The check valves 5 and 6 prevent air or fluid from bleeding back out of the tank 7 and into the service brake line, thus insuring that there will be a correct fluid supply for the emergency brake system. A second tank 8 of smaller capacity than the tank 7 is connected to that tank by the pipe 9. An orifice plate 10 is mounted in the pipe 9, and this orifice plate has a fixed orifice, or the orifice may be adjustable as in a valve which is constantly open, if this is found advisable. We prefer, however, that the flow of air necessary to adequately brake the vehicle shall be calculated and, therefore, the orifice plate 10 and the orifice therein can be so constructed to provide for this correct flow. The tank 8 may be adjustable, that is, one end 11 of the tank may be threaded onto the other end 12, thus enabling the capacity of the tank to be varied to suit the particular vehicle. The capacity of the tank 8 shall be such that the brakes may be initially set, that is, the brake shoes may be applied to the drums and the lines may be completely filled with air or other fluid. Thereafter, the complete braking occurs by the additional supply of air from the tank 7.

A solenoid actuated valve 13 is positioned in the outlet pipe 14 from the tank 8. The solenoid valve 13 includes a body 15 which has an intake port 16 and an outlet port 17. A valve actuating arm 18 controls the flow of air from the port 16 to the port 17. The valve arm 18 is connected to and is controlled by the handle 19 which is pivotally mounted in the body 20 of the valve. A latch 21 engages the pin 22 on the handle 19 to hold that handle in raised position and with the valve 13 closed no air flows through the valve. When the solenoid 22' is actuated it releases the latch 21, permits the handle 19 to drop downwardly, thus allowing the valve arm 18 to drop. This type of solenoid actuated valve is usual and well known in the trade and can be purchased on the open market. The solenoid 22' may be actuated by the driver, preferably by depressing a contact button or other electrical switch. An outlet port 17 is provided in the body 15. The port 17 is controlled by a spring pressed valve 17a. A second port 17' is controlled by the spring pressed valve 17b. The valves 17a and 17b are alternately opened and closed by means of a lever 18' extending from the valve arm 18. As thus described the commercial valve 13 is adapted for uses other than the one in which we place the valve. For our purpose, however, the port 17' is closed by means of a plug, and as thus modified the valve 13 operates as a simple solenoid actuated one-way valve which controls the air pressure to the brake system of the vehicle. When the valve 13 is open, air or fluid flows through the pipe 23 to actuate the brake actuators 24. These actuators are of the usual diaphragm type, and they push a rod 25 which extends to a clevis 26, the clevis in turn engaging the arm 27, which arm in turn is secured to the brake shaft 28. Due to the clevis 26 it is possible to operate the brake shaft 28 in the normal manner to operate the service brakes at intervals as required. When the emergency brake is actuated it will function to operate the same shaft 28 and apply the brakes to the vehicle.

In operation the capacity of the various cylinders and pipe lines of the vehicle is calculated and the tank 8 is adjusted so that its pressure will cause the brake shoes to engage the drums. The tank 7 is at the same time maintained at the proper fluid pressure from the original source of pressure 1. If for some reason the service brakes should cease to function because of breaking of a line or the like, the operator actuates the solenoid 22' which opens the solenoid valve and permits this fluid to flow to the pipe 23 and thence into the actuators 24. Once the solenoid 22' has been actuated, the arm 19 will drop to a position to open the valve 17a and the vehicle will be brought to a gradual and complete stop, due to the fact that the tank 7 continues to bleed air or fluid into the tank 8 through the orifice 10 at a correct rate of flow to bring the vehicle to a halt without a sudden or harsh application of the brakes. The brakes will continue to remain in a set position until the operator manually lifts the arm 19 and reengages the latch 21. When this occurs the fluid pressure to the actuators 24 is cut off and the vehicle brakes are thus released through the release valve 17ᵇ and the vehicle can again be driven.

Having described our invention, we claim:

1. An emergency brake system for vehicles, a fluid pressure source, a first tank, a pipe extending from the fluid pressure source to the first tank, a second tank, and means to adjust said second tank to vary the capacity thereof, a pipe extending from the first tank to the second tank, a fluid restricting means in said last named pipe, an outlet pipe extending from the second tank to brake operating means, and manually controlled electrically operable valve means in the outlet pipe, said valve remaining in an open position when actuated until manually reclosed, said valve being remotely positioned from the vehicle operator and being reclosable when the vehicle is stopped.

2. An emergency brake system for vehicles, a fluid pressure source, a first tank, a pipe extending from the fluid pressure source to the first tank, a second tank, and means to adjust said second tank to vary the capacity thereof, a pipe extending from the first tank to the second tank, a fluid restricting means in said last named pipe, an outlet pipe extending from the second tank to brake operating means, a solenoid actuated valve in the outlet pipe, said solenoid valve remaining in an open position when actuated until manually reset, said valve being remotely positioned from the vehicle operator and being resettable when the vehicle is stopped.

3. An emergency brake system for vehicles, comprising a fluid pressure source, a first tank, a pipe leading from the fluid pressure source to the first tank, a second tank, a pipe extending from the first tank to the second tank, an orifice plate in said pipe restricting the flow from the first tank to the second tank, an outlet pipe extending from the second tank to the brake actuating means, a manually controlled valve means in the outlet pipe, said valve remaining in an open position when actuated and is manually reset to a closed position.

4. An emergency brake system for vehicles, comprising a fluid pressure source, a first tank, a pipe leading from the fluid pressure source to the first tank, a second tank, a pipe extending from the first tank to the second tank, an orifice plate in said pipe restricting the flow from the first tank to the second tank, an outlet pipe extending from the second tank to the brake actuating means, a solenoid actuated valve in the outlet pipe, said valve being moved to an open position by the solenoid and manually closed.

5. An emergency brake system for vehicles, comprising a fluid pressure source, a first tank, a pipe leading from the fluid pressure source to the first tank, a second tank, a pipe extending from the first tank to the second tank, an orifice plate in said pipe restricting the flow from the first tank to the second tank, an outlet pipe extending from the second tank to the brake actuating means, a solenoid actuated valve in the outlet pipe, said valve being moved to an open position by the solenoid and manually closed, and means to adjust the second tank to vary the capacity thereof.

References Cited in the file of this patent
UNITED STATES PATENTS

| | | |
|---|---|---|
| 1,134,442 | Donovan | Apr. 6, 1915 |
| 1,529,058 | Folker | Mar. 10, 1925 |
| 1,886,936 | Bowen | Nov. 8, 1932 |
| 2,027,469 | Campbell | Jan. 14, 1936 |
| 2,045,175 | Baughman | June 23, 1936 |
| 2,109,168 | Miller | Feb. 22, 1938 |
| 2,185,261 | Leupold | Jan. 2, 1940 |
| 2,240,166 | Stanley | Apr. 29, 1941 |
| 2,409,908 | Simpkins | Oct. 22, 1946 |
| 2,578,388 | Ambler | Dec. 11, 1951 |